(12) United States Patent
Penkkimaki

(10) Patent No.: US 12,072,030 B2
(45) Date of Patent: Aug. 27, 2024

(54) VENTING VALVE AND METHOD OF MOUNTING VALVE STEM OF VENTING VALVE

(71) Applicant: WD RACING OY, Siuro (FI)

(72) Inventor: Pekka Penkkimaki, Siuro (FI)

(73) Assignee: WD RACING OY, Siuro (FI)

( * ) Notice: Subject to any disclaimer, the term of this patent is extended or adjusted under 35 U.S.C. 154(b) by 0 days.

(21) Appl. No.: 17/793,314

(22) PCT Filed: Jan. 13, 2021

(86) PCT No.: PCT/FI2021/050018
§ 371 (c)(1),
(2) Date: Jul. 15, 2022

(87) PCT Pub. No.: WO2021/144503
PCT Pub. Date: Jul. 22, 2021

(65) Prior Publication Data
US 2023/0349476 A1      Nov. 2, 2023

(30) Foreign Application Priority Data

Jan. 16, 2020   (FI) ..................................... 20205042

(51) Int. Cl.
*F16K 17/04*      (2006.01)
*B29C 33/10*      (2006.01)
(52) U.S. Cl.
CPC .............. *F16K 17/04* (2013.01); *B29C 33/10* (2013.01)

(58) Field of Classification Search
CPC ......... B29V 33/10; F16K 24/04; F16K 17/04; B29D 2030/0617
See application file for complete search history.

(56) References Cited

U.S. PATENT DOCUMENTS 4,347,212 A * 8/1982 Carter ..................... B29C 33/10
264/315
5,939,101 A * 8/1999 Green ..................... B29C 33/10
249/141

(Continued)

FOREIGN PATENT DOCUMENTS

| CN | 101323154 | 12/2008 |
|---|---|---|
| CN | 205767049 | 12/2016 |
| CN | 205818269 | 12/2016 |

(Continued)

OTHER PUBLICATIONS

Translation of EP0774333 retrieved from espacenet.com Nov. 2023 (Year: 2023).*

(Continued)

*Primary Examiner* — Jessica Cahill
(74) *Attorney, Agent, or Firm* — DeLizio, Peacock, Lewin & Guerra LLP

(57) ABSTRACT

A venting valve and method of mounting a valve stem of a venting valve. The venting valve (3) comprises a valve body (4) inside which is a venting channel (5) which is provided with a movable valve stem (6) comprising a valve member (7) and a collar (8) at an opposite end of the valve stem. A spring element (9) is arranged around the valve stem. Movement of the valve stem is limited by means of an internal retaining ring (11) mounted to inside the venting channel.

19 Claims, 6 Drawing Sheets

(56) References Cited

U.S. PATENT DOCUMENTS

| | | | |
|---|---|---|---|
| 2010/0201048 A1* | 8/2010 | Penkkimaki | B29D 30/0606 |
| | | | 264/572 |
| 2019/0255741 A1* | 8/2019 | Hasseloef | B29D 30/0606 |

FOREIGN PATENT DOCUMENTS

| | | | | |
|---|---|---|---|---|
| CN | 205818269 U | * | 12/2016 | |
| CN | 109435293 A | * | 3/2019 | B29D 30/0606 |
| DE | 102016209912 | | 12/2017 | |
| EP | 0774333 | | 5/1997 | |
| FR | 3107202 A1 | * | 8/2021 | |
| GB | 922788 A | * | 8/1959 | |
| GB | 2339163 | | 1/2000 | |
| JP | 2006159596 A | * | 6/2006 | |
| KR | 20110059062 | | 6/2011 | |
| KR | 101600324 | | 3/2016 | |
| TW | 201132482 | | 10/2011 | |
| WO | 2021144503 | | 7/2021 | |

OTHER PUBLICATIONS

"Finland Patent Application No. 20205042 Search Report", May 8, 2020, 2 pages.

"PCT Application No. PCTFI2021050018 International Search Report and Written Opinion", Mar. 25, 2021, 10 pages.

* cited by examiner

VENTING VALVE AND METHOD OF MOUNTING VALVE STEM OF VENTING VALVE

BACKGROUND OF THE INVENTION

The invention relates generally to a tyre manufacturing process and means used therein.

More specifically the disclosed solution relates to a venting valve intended for removing air from a vulcanising mould of a vehicle tyre.

The invention further relates to a method of mounting a valve stem of a venting valve.

The field of the invention is defined more specifically in the preambles of the independent claims.

When manufacturing pneumatic vehicle tyres, vulcanization molds are used. It is known that any tyre vulcanization mold must be vented so that a green tyre or tyre blank during blowing from an interior can come into contact with shaping tools of the vulcanization mold. During this process an exterior of the green tyre pushes the air radially outwardly. In case this air cannot be vented, it can cause missing contact between the inner contour of the vulcanization mold and the outer contour of the green tyre leading thereby deviations in the designed shapes and surface patterns of the tire. This is why tyre manufacturers pay great attention to the venting of vulcanization molds. The vulcanization mold is provided with a large number of venting bores in order to discharge the air out of the mold. The mold may comprise several hundreds or even 1000-9000 individual venting bores so that air pockets may be avoided. The venting bores can be equipped with venting valves which prevent the tyre material from entering the venting bore. Some venting valves are disclosed in documents EP-0774333-B1, GB-2339163-A, CN-205767049-U and CN-205818269-U. However, the known venting valves and their mounting principles have shown to contain some disadvantages.

BRIEF DESCRIPTION OF THE INVENTION

An object of the invention is to provide a novel and improved venting valve and a method for mounting the venting valve.

The venting valve according to the invention is characterized by the characterizing features of the independent apparatus claim.

The method according to the invention is characterized by the charactering features and steps of the independent method claim.

An idea of the disclosed solution is that the venting valve comprises a valve stem movement of which is limited by means of a retaining ring relative to a valve body of the venting valve. The retaining ring is an internal locking element which is mounted inside an axial venting channel of the valve body. In other words, the venting valve is provided with an internal locking arrangement for the valve stem. Inner parts of the retaining ring are configured to form retaining surfaces preventing a collar of the valve stem to pass the retaining ring. Further, the internal retaining ring provides axial support for a spring element which is intended for keeping the valve stem in a normal open position. The retaining ring comprises radial inner surfaces facing towards the valve stem so that it also provides transverse support for the valve stem.

An advantage of the disclosed solution is that the structure of the internal retaining ring assembly allows the rest of the venting valve structure be simple, whereby it is easy to manufacture and is inexpensive too. Mounting of the retaining ring is facilitated when it can be simply pushed inside the venting channel. Furthermore, the venting valve may be provided with clear and relatively wide venting path which improves air discharge properties.

According to an embodiment, the retaining ring is the only physical element at the second end part of the valve for providing the lateral support and guidance, and it is also the only structure for supporting the spring element at the second end. In other words, the valve body is without any supporting surfaces for the valve stem and the spring element at the second end part of the valve body.

In other words, the retaining ring is a multipurpose fastening element, which is inexpensive and simple to mount. Further, the structure of the valve body and its valve channel may be simple.

According to an embodiment, the retaining ring is an elastically deformable element which has a basic shape and is squeezable temporarily to reduced dimensions. When the mounting force is released the retaining ring returns towards it original shape.

According to an embodiment, the retaining ring is made of metal material, such as steel.

According to an embodiment, the retaining ring is made of plastic material or other polymer material.

According to an embodiment, the retaining ring is a spring like element configured to reduce its outer dimensions when being inserted inside the venting channel and is configured to expand when being released to its basic shape. When the retaining ring is inserted to an internal retaining groove or corresponding locking position, it will snap into its place. Let it be mentioned that the venting channel may also be without any locking groove.

According to an embodiment, the retaining ring comprises elastically deformable protrusions or parts. Then the retaining ring may have a basic shape and it is deformable to minor dimensions when an external force is subjected to it.

According to an embodiment, the collar of the valve stem is provided with a first conical surface. The first conical surface is facing away from a valve member of the valve stem i.e. it is located at a second end of the valve body. The conical surface causes the retaining ring to expand when the valve stem is mounted by means of longitudinal pushing movement inside the venting channel. The mounting may be smooth and controlled thanks to slanting surfaces of the conical surface.

According to an embodiment, the collar of the valve stem is provided with a second conical surface. The second conical surface is facing the first end of the valve body provided with a valve member. The conical surface causes the retaining ring to expand when the valve stem is removed from the venting channel by pushing it longitudinally towards the first end of the valve body. This embodiment makes it possible to remove the valve insert comprising the valve stem and an opening spring if needed. Thanks to the slanting surfaces the removal is easy to execute.

According to an embodiment, cross sectional diameter of the venting channel is constant between the first and second end of the valve body. In other words, the venting channel is without any shoulders. Thus, the venting channel is a uniform cylindrical space, which is easy to manufacture. The configuration is advantageous also for the discharged air flow. Smooth inner surface allows fluent air flow.

According to an embodiment, the valve stem and its collar have solid configuration. In other words, the valve stem is without any axial slits or void spaces for allowing it to be pressed into smaller radial dimensions.

According to an embodiment, the venting valve further comprises a retaining groove on an inner surface of the valve channel for receiving the retaining ring. Then the retaining ring is mounted inside the retaining groove and is configured to partly protrude inside the venting channel thereby forming retaining surfaces preventing the collar to pass them. The retaining groove provides the valve body with a predetermined locking position for the valve stem.

According to an embodiment, it may be possible to provide the valve body with two retaining grooves which are located at axial distance from each other in longitudinal direction of the valve body. Then it is possible to select which groove is used for locking the retaining ring. This way it is possible to influence to axial stroke length of the valve stem.

According to this embodiment, the retaining ring is a multipurpose fastening element, which only requires a simple groove for receiving the retaining ring. In this embodiment the locking is based on shape locking principle.

According to an embodiment, shape of the retaining ring corresponds substantially to letter C, whereby the retaining ring has C-shaped configuration.

According to an embodiment, the retaining ring is an E-type retaining ring, which is also known as the E-Ring or E-clip.

According to an embodiment, the retaining ring comprises radial inner surfaces which are provided with curved surfaces which together resemble a circle corresponding to a round cross sectional shape of the valve stem at the location of the retaining ring. In other words, the retaining ring is provided with round central support surfaces which conform to the valve stem protruding the central aperture of the retaining ring. The mentioned supporting inner surfaces may be dimensioned so that they provide appropriate support and do not have negative affect on axial movement.

According to an embodiment, the retaining ring is friction mounted against the surfaces of the venting channel. Thus, the mounting may be without any retaining groove.

According to an embodiment, the retaining ring comprises at least one deformable retaining element configured to deform during the mounting and to cause retaining forces directed towards the surfaces of the venting channel. In this embodiment the retaining ring is friction mounted against the surfaces of the venting channel. The retaining element comprises deformable protrusions or parts by means of which high local friction forces may be generated.

According to an embodiment, the retaining ring comprises one or more radial protrusions extending from its radial outer surface. Correspondingly, the valve body comprises one or more radial openings passing through the valve body. Then the one or more radial openings of the valve body are configured to receive the mentioned one or more radial protrusions of the retaining ring. In other words, the radial protrusions and the radial openings form together a shape locking pair. The radial openings may be transverse drillings or slits made by milling techniques, for example.

According to an embodiment, the mentioned protrusions of the retaining ring are configured to be bent during the mounting when the retaining ring is inserted inside the venting channel, and are configured to be released from the bent state when the radial protrusions match with the radial openings. When the correct mounting position is reached, the protrusions penetrate inside the openings. At least tip part of the radial protrusions penetrate inside the openings, slits or other cavities inside the venting channel.

According to an embodiment, the retaining ring has 1-8 radial protrusions and the valve body has the same amount of the receiving radial openings. However, in some implementations it may be possible to provide the valve body with greater number of openings. Further, it may be possible that the number of openings is greater than the number of the protrusions, whereby the retaining ring may have several alternative mounting positions, i.e. orientation of the retaining ring around central axis of the valve body may be selected more freely since there are several locking positions. For example, number of openings may be six and number of protrusions may be four.

According to an embodiment, the retaining ring has star-like configuration and comprises several branches or arms.

According to an embodiment, the retaining ring may comprise a cutting in order to facilitate squeezing of the retaining ring into smaller dimension. Thus, there may be a mounting gap in the retaining ring.

According to an embodiment, the radial openings are holes penetrating transversely through the valve body. The holes may be made by drilling, for example.

According to an embodiment, the radial openings are slots penetrating transversely through the valve body. The slots may be made by milling, for example.

According to an embodiment, the retaining ring comprises two ring-shaped elements inside each other and connected to each other. An outer ring element serves as a retaining element and is intended for fastening the retaining ring axially inside the venting channel. An inner ring element serves as an axial retaining surface against the collar of the valve stem. Further, the inner ring element provides transverse support for the valve stem.

According to an embodiment, the disclosed retaining ring with two nested ring elements may be utilized not only with the friction mounting embodiment but it may also be implemented with the retaining groove mounting.

According to an embodiment, the above mentioned outer ring element is configured to serve also as an axial support surface for the spring element. Then the outer ring element is dimensioned to protrude radially inside the venting channel and to form a flange element against which the spring can be supported.

According to an embodiment, the above mentioned inner ring element is configured to serve also as an axial support surface for the spring element. Then the inner ring element is dimensioned to be large enough to form a flange element against which the spring can be supported.

According to an embodiment, the inner ring element is provided with a radial slot allowing the ring-shaped element to be expanded when the valve stem is mounted.

According to an embodiment, the outer ring element comprises a radial slot allowing it to be squeezed into smaller diameter when being mounted. In an alternative solution the outer ring element is provided with bendable protrusions whereby no radial slot is needed for the mounting.

According to an embodiment, the retaining ring comprises a radial outer portion and a radial inner portion which are configured to extend different distances in axial direction of the venting valve. Then stroke length of the valve stem can be influenced by means of the axial extension of the inner portion of the retaining ring. Thus, this embodiment provides a simple stroke length adjustment.

According to an embodiment, the inner portion of retaining ring has greater material thickness compared to the outer portion.

According to an embodiment, the retaining ring has a hat-like configuration wherein the retaining ring is shaped so that the inner portion protrudes relative to the outer portion. The retaining ring may have equal thickness at the inner portion and the outer portion. The stroke length of the valve stem may be adjusted by selecting mounting position of the retaining ring, i.e. whether the protruding inner portion is directed towards the valve member or the collar.

According to an embodiment, the retaining ring has a bendable inner portion whereby the inner portion may be bent so that it protrudes axially relative to the outer portion. The stroke length of the valve stem may be adjusted by influencing to magnitude of a bending angle of the inner portion.

According to an embodiment, the solution relates to a method of mounting a valve stem of a venting valve. The method comprises pushing the valve stem under external mounting force longitudinally in mounting direction inside a venting channel against a spring force generated by means of a spring element. The method further comprises providing the valve stem with a collar and preventing the valve stem to escape from the valve channel by means of an internal retaining ring supporting against the mentioned collar when the mounting force is removed and when the spring force tries to move the valve stem against the mounting direction. The mentioned retaining ring is mounted inside the venting channel. The method further comprises providing the valve stem with lateral guidance at a second end part of the valve body only by means of the retaining ring. Further, the spring element is supported axially at the second end part by means of the retaining ring. Thus, the method comprises mounting the retaining inside the venting channel and using it for three purposes: holding the collar or limiting its movements, providing lateral support for the valve stem, and further, supporting the spring axially. Thank to this, the other components may be relatively simple, whereby they can be easily manufactured.

According to an embodiment, the method comprises reducing size of the retaining ring radially by means of conical surfaces of the collar when pushing the valve stem axially towards the mounting direction and correspondingly pushing the valve stem in an opposite direction when dismounting the valve stem.

According to an embodiment, the method comprises the following steps: squeezing the retaining ring into smaller size; mounting the retaining ring inside the valve channel; pushing the retaining ring axially towards the retaining groove; and allowing the retaining ring to expand when the retaining element and a retaining groove on an inner surface of the venting channel match in the axial direction, whereby the expansion causes the retaining ring to be locked into the retaining groove.

According to an embodiment, the method comprises adjusting stroke length of the valve stem by means of the retaining ring. The axial position of the retaining ring may be adjusted, shape of the retaining ring may be modified or mounting direction of the retaining ring may be selected in order execute the adjustment.

The above disclosed embodiments and features may be combined in order to form suitable solutions that are needed.

BRIEF DESCRIPTION OF THE FIGURES

Some embodiments are described in more detail in the accompanying drawings, in which.

For the sake of clarity, the figures show some embodiments of the disclosed solution in a simplified manner. In the figures, like reference numerals identify like elements.

DETAILED DESCRIPTION OF SOME EMBODIMENTS

Figure 1:
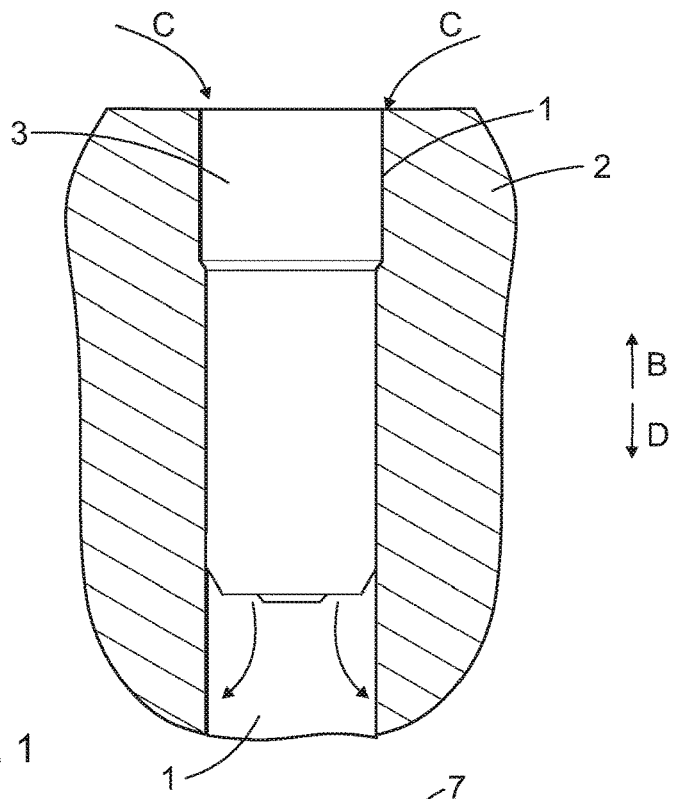
FIG. 1 is a schematic and partly sectional view of a venting valve mounted to a venting bore of a vulcanization mold.

FIG. 1 discloses a venting bore 1 of a vulcanization mold 2. The bore 1 has a first opening 1a at an inner side of the mould and a second opening at second side of the mould (not shown). The bore 1 is provided with a venting valve 3. Air inside of the mold can be vented through the venting valve 3 and the bore 1 out of the mold. The venting valve 3 is intended to be closed before material of the tire so that the tire material will not plug the venting bore 1.

Let it be mentioned that in this document terms tyre and tire mean the same as well as the terms mold and mould.

Figure 2:
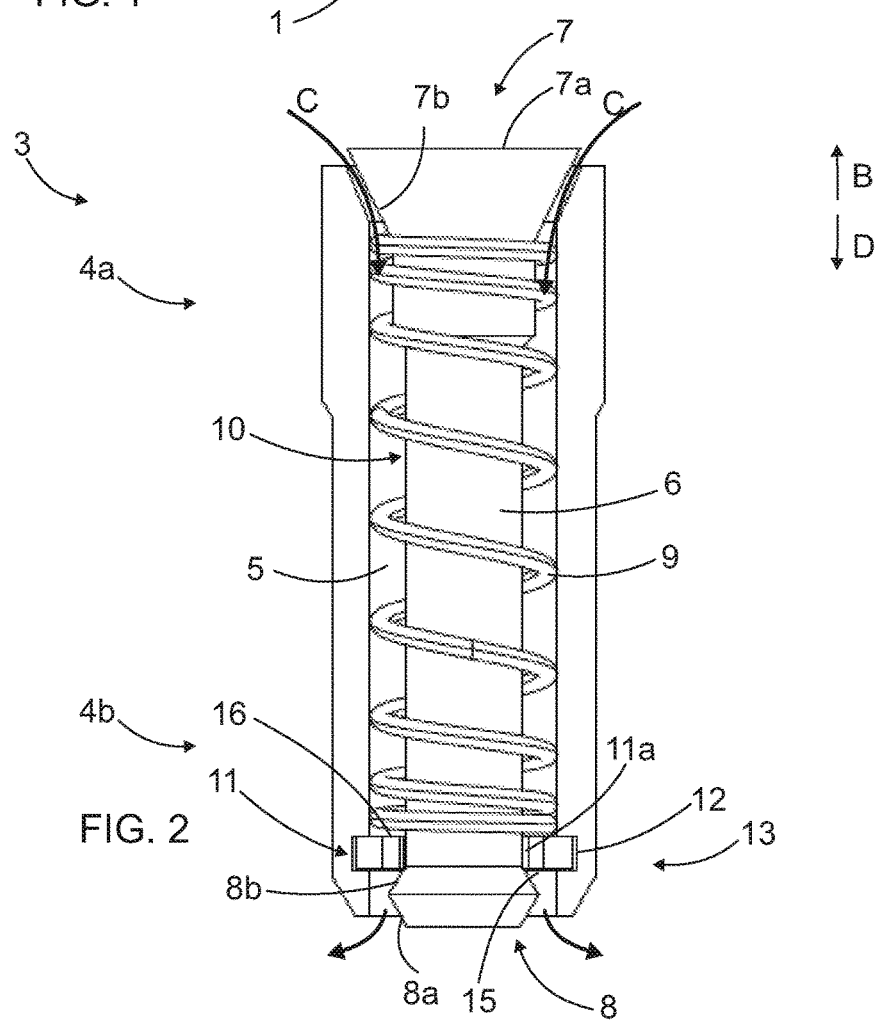
FIG. 2 is a schematic and sectional side view of a venting valve provided with an internal retaining ring mounted to an internal retaining groove.
Figure 3:
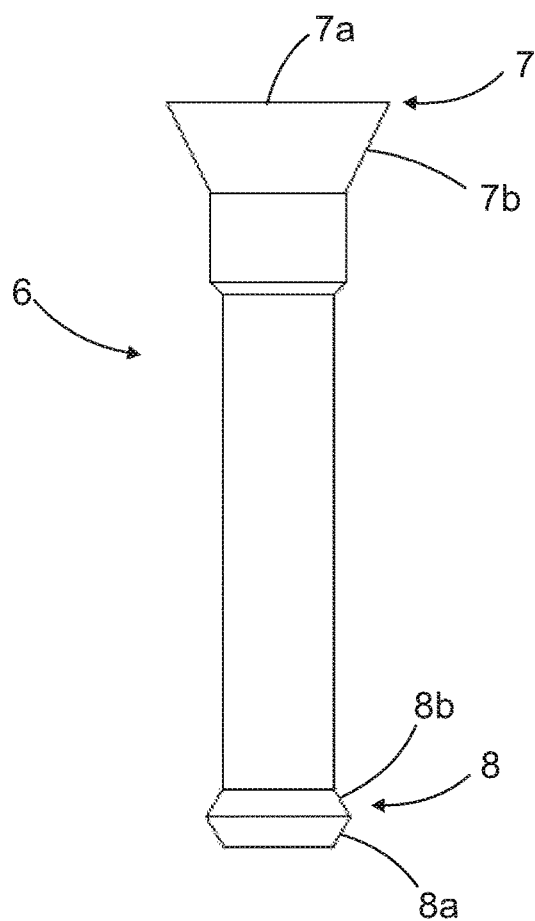
FIG. 3 is a schematic side view of a valve stem mountable inside a central venting channel of the venting valve.
Figure 4:
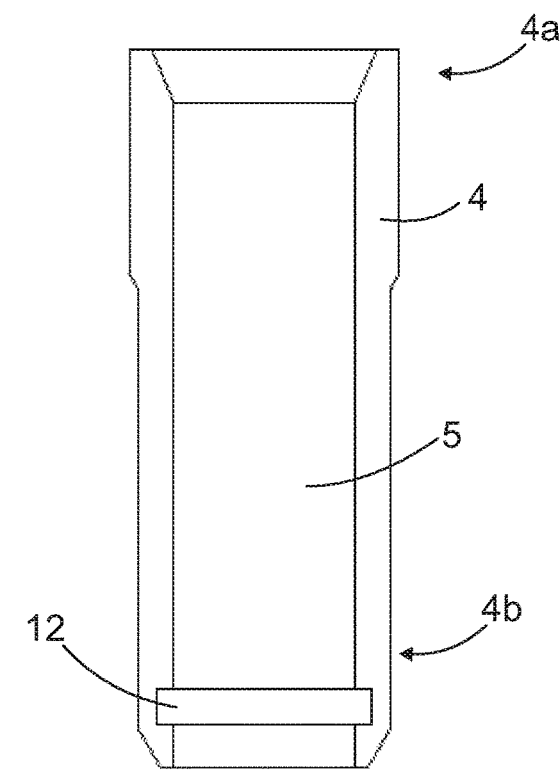
FIG. 4 is a schematic side view of an elongated valve body provided with a central venting channel.

FIG. 2 discloses a venting valve 3 comprising a valve body 4 provided with a first end 4a and a second end 4b. The first end 4a is facing towards an interior of the mould and the second end 4b is facing away from the interior of the mold. The valve body 4 is further provided with a central venting channel 5 via which the vented air is configured to flow. In other words, the valve body is an elongated sleeve-like element comprising an outer surface and inner surface. The outer surface may form a friction locking with surfaces of the venting bore. A valve stem 6 is mounted inside the venting channel 5. The valve stem 6 is axially movable relative to the valve body 4 for a limited distance. The valve stem 6 comprises a first end 6a provided with a valve member 7 for opening and closing the venting channel 5. The valve member 7 comprises a top surface 7a and conical sealing surfaces 7b. A second end 6b of the valve stem 6 is provided with a collar 8. The collar 8 is an enlarged portion at a distal end of the valve stem 6 and the collar 8 may be provided with a first conical surface 8*a* and a second conical surface. A spring element 9 is arranged to press the valve stem 6 in opening direction B towards an opening position wherein air flow C through the venting channel 5 is allowed. The spring element 9 may be a helical spring, for example. Tire blank material fed inside the mold presses the valve member 7 against spring force generated by the spring element 9 and closes a gap between the sealing surfaces 7*b* of the valve member 7 and mating sealing surfaces of the valve body 4. In other words, the tire blank moves the valve stem in closing direction D. The valve stem 6 and the spring element 9 form together a valve insert 10 mounted inside the valve body 4.

The venting valve 3 further comprises a locking arrangement 13 or locking system which is located at a second end portion 4*b* of the valve body 4 and is configured to limit the movement of the valve stem 6 in the opening direction B. The locking arrangement 13 comprises an internal retaining ring 11 which serves as a mechanical locking element. The second end part 4*b* of the valve body 4 is provided with a retaining groove 12 on its inner surface for receiving the retaining ring 11. Thus, the retaining groove 12 or fastening groove is located in the venting channel 5. The retaining ring 11 mounted inside the retaining groove 12 can partly protrude inside the venting channel 5 in radial direction. Protruding parts 11*a* of the retaining ring 11 are configured to form retaining surfaces 15 facing towards the collar 8 and preventing the collar 8 to pass the preventing surfaces 15. The protruding parts 11*a* of the retaining ring 11 also provide the valve stem 6 with lateral support so that there is no need for any other mechanical support at the second end of the venting valve 3 for the valve stem 6.

Since the collar 8 has the first conical surface 8*a* and the second conical surface 8*b*, the valve stem 6 can be easily mounted by pushing it axially inside the venting channel 5, and can be correspondingly easily removed by pushing it axially in the opposite direction if the valve insert needs to be replaced. The conical surfaces 8*a*, 8*b* will smoothly expand the retaining ring 11 when the valve stem 6 is forced to move axially by means of external mounting force. There may be a clearance between an outer rim of the retaining ring 11 and an inner rim of the retaining groove 12 so that the retaining ring 11 can expand. Alternatively only an inner portion or element of the retaining ring 11 is arrange to be expanded during the mounting of the valve stem 6.

Further, as can be noted the spring element 9 is supported at the second end 4*b* by means of the retaining ring 11 to the valve body 4. Thereby no shoulders or other fixed support surfaces are needed and the venting channel may have straight walls.

Figure 5:
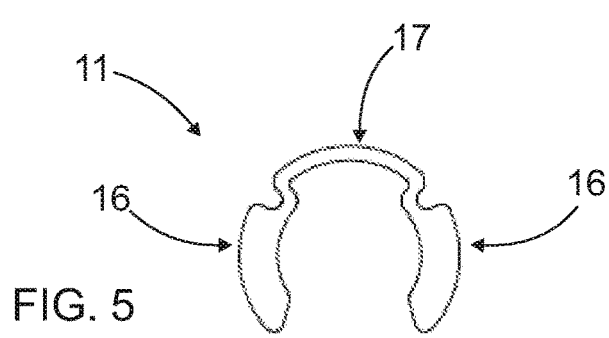
FIGS. 5 and 6 are schematic top views of a possible inner retaining ring.
Figure 6:
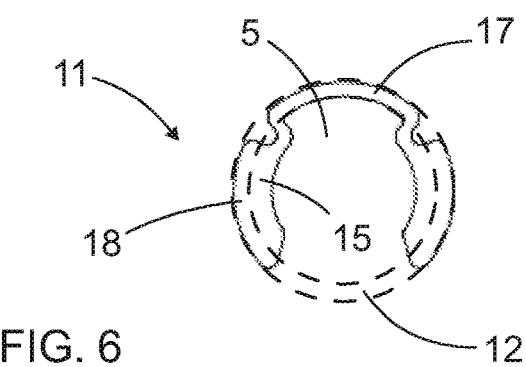

FIGS. 5 and 6 disclose a retaining ring 11 which comprises two support widenings 16 and a spring portion between them. In FIG. 6 a retaining groove 12 is illustrated by means of broken lines. As can be noted widenings 16 protrude partly inside a venting channel 5 and provide retaining surfaces 15 therein. Portion 18 is axially supported by means of the retaining groove 12. The retaining ring 11 shown in FIGS. 5 and 6 is very simple and inexpensive. The disclosed retaining ring 11 may be called a C-type retaining ring.

Figures 7, 8:
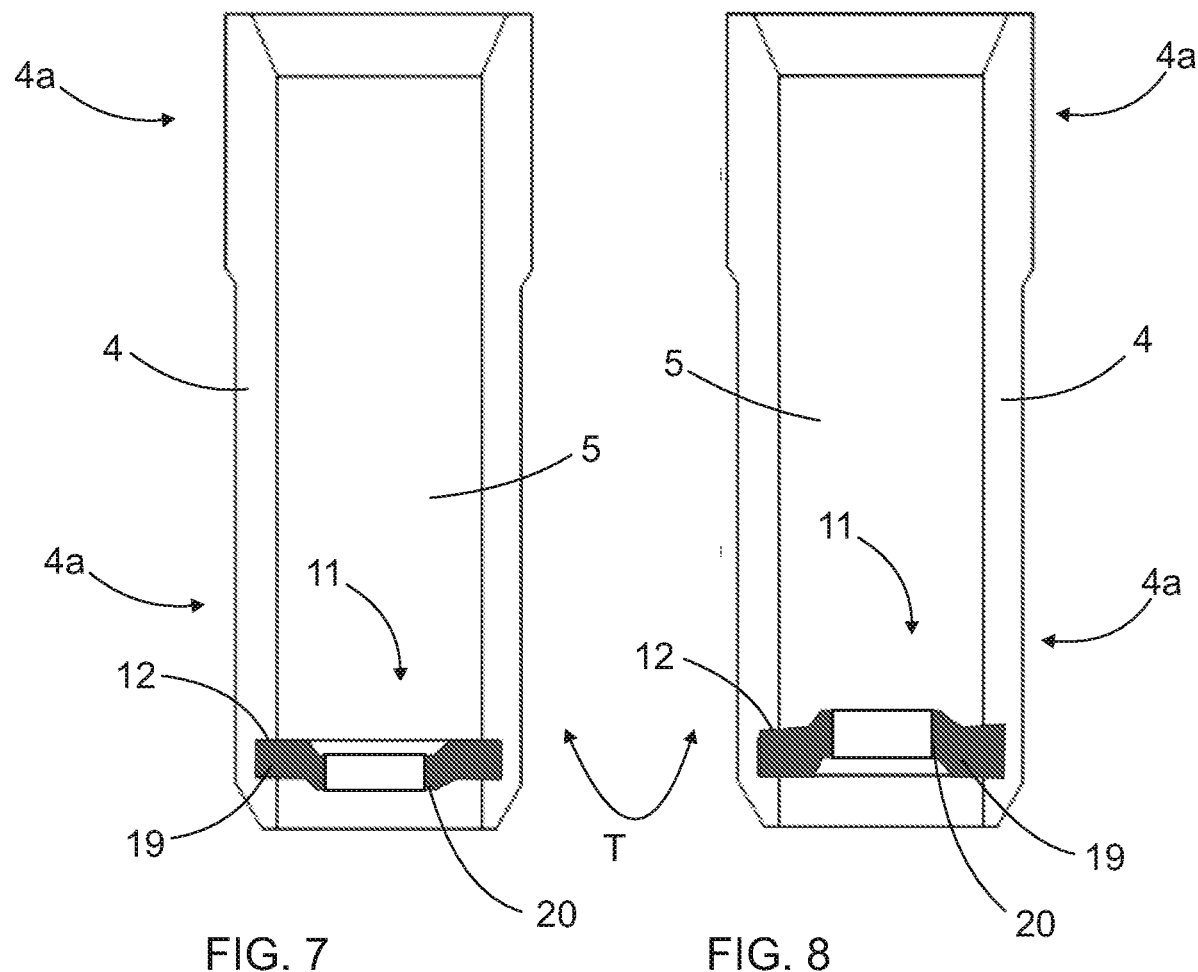
FIGS. 7 and 8 are schematic side views of valve bodies and two alternative ways of mounting a retaining ring into their retaining grooves.

FIGS. 7 and 8 disclose a retaining ring 11 comprising an outer portion 19 and an inner portion 20. The inner portion 20 may protrude axially in relation to the outer portion 19. In FIG. 7 the retaining ring 11 is mounted so that the protruding inner portion 20 is directed towards the second end 4*b* of the valve body 4 and in FIG. 8 the inner portion 20 protrudes towards the first end 4*a*. It is possible to use the same retaining ring 11 selectively and to turn T it upside down according to the need.

Figure 9:
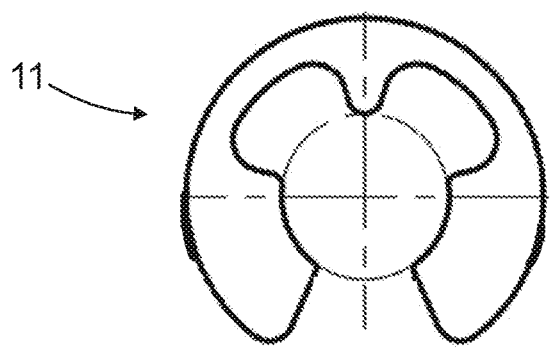
FIGS. 9-13 are schematic top views of some inner retaining rings.

FIG. 9 discloses an internal retaining ring 11 which may called an E-type retaining ring.

Figure 10:
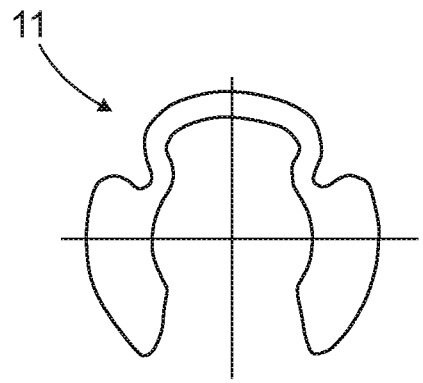
Figure 11:
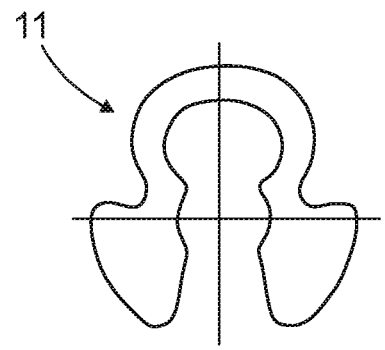

FIGS. 10 and 11 show some additional C-type retaining rings 11 which may be implemented in this venting valve solution.

Figure 12:
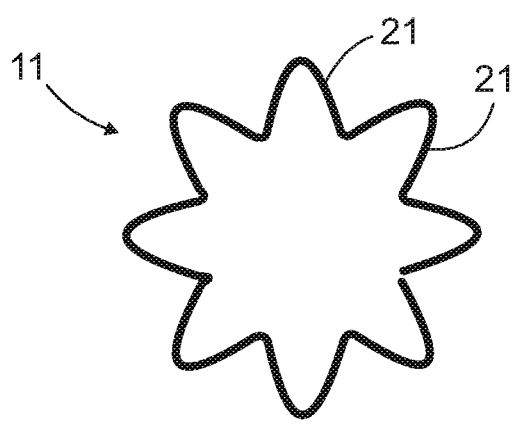

FIG. 12 discloses a star-like retaining ring 11 comprising several radially protruding portions or arms 21.

Figure 13:
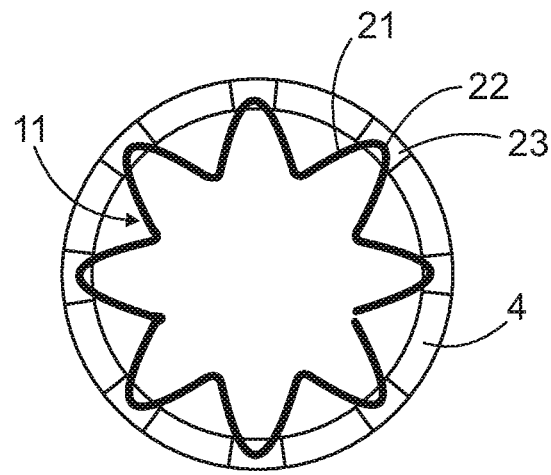

FIG. 13 discloses a star-like retaining ring 11 comprising several arms 21. Tip portions 22 of the arms 21 may be locked to openings 23 of the valve body 4.

Figure 14:
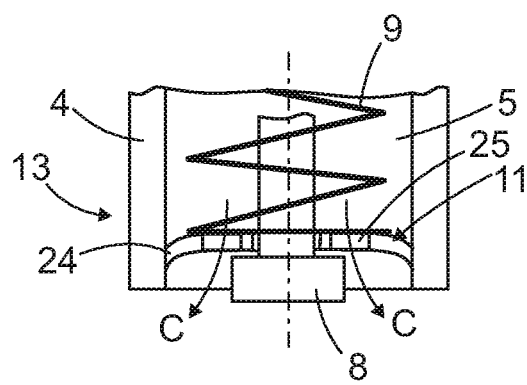
FIGS. 14 and 15 are schematic side views of second end portions of a venting valve and two alternative solutions for arranging a retaining ring with friction mounting principle.
Figure 15:
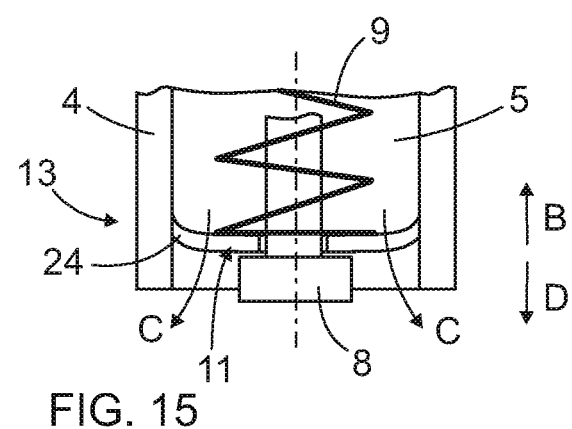

FIGS. 14 and 15 discloses locking arrangements 13 wherein the valve body 4 is without a retaining groove or openings but instead the retaining ring 11 is friction mounted against inner surfaces of the venting channel 5. Outer portion of the retaining ring 11 may comprise bendable portions 24 which may bend when the retaining ring is pushed inside the venting channel 5 and which provide required force to generate needed friction forces. In FIG. 14 the retaining ring 11 is pushed from the second end side and in FIG. 15 it is pushed from the first end side of the valve body 4. The retaining ring 11 may comprise openings 25 through which the air can escape or the structure may be star-like or comprise several separate protrusion so that air passages a left between them.

Figure 16:
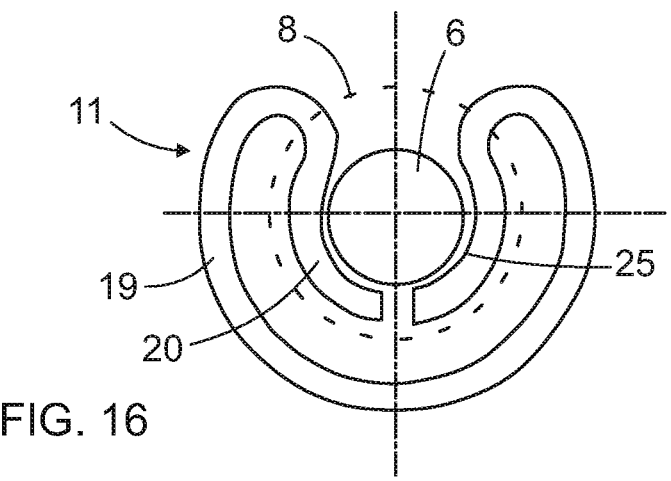
FIG. 16 is a schematic top view of retaining ring comprising an inner portion and an outer portion.

FIG. 16 discloses a retaining ring 11 comprising an outer portion 19 and an inner portion 20. The inner portion 20 has support surfaces 25 facing towards a valve stem 6. The inner portion 20 prevents a collar 8 to move axially through an aperture in the inner portion 20.

Figure 17:
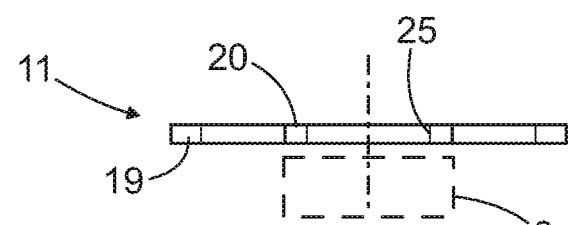
FIGS. 17-19 are schematic side views of three alternative solutions for utilizing the retaining ring of FIG. 16.
Figure 18:
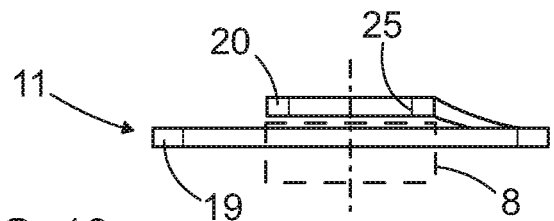
Figure 19:
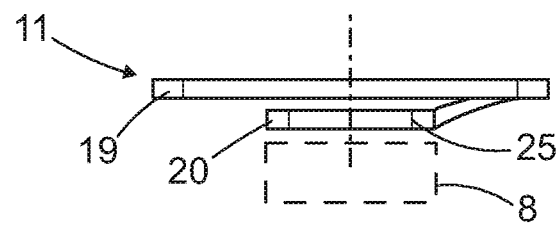

In FIG. 17 the inner portion 20 and the outer portion 19 are on the same level, whereas in FIGS. 18 and 19 the inner portion 20 is bent in axial direction.

Figure 20:
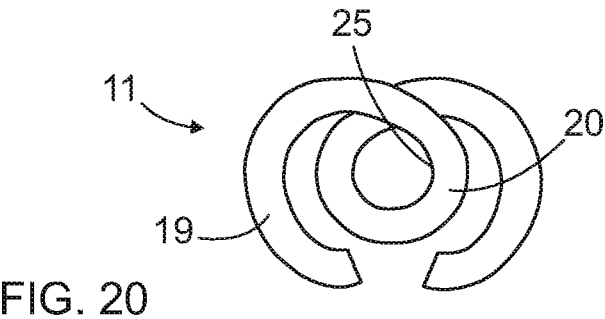
FIG. 20 is a schematic top view of a retaining ring or element comprising a spiral or screw-like configuration.

FIG. 20 discloses a spiral-like retaining ring 11 which also comprises an outer portion 19 and an inner portion 20. The inner portion 20 has support surfaces 25 for the valve stem.

Figure 21:
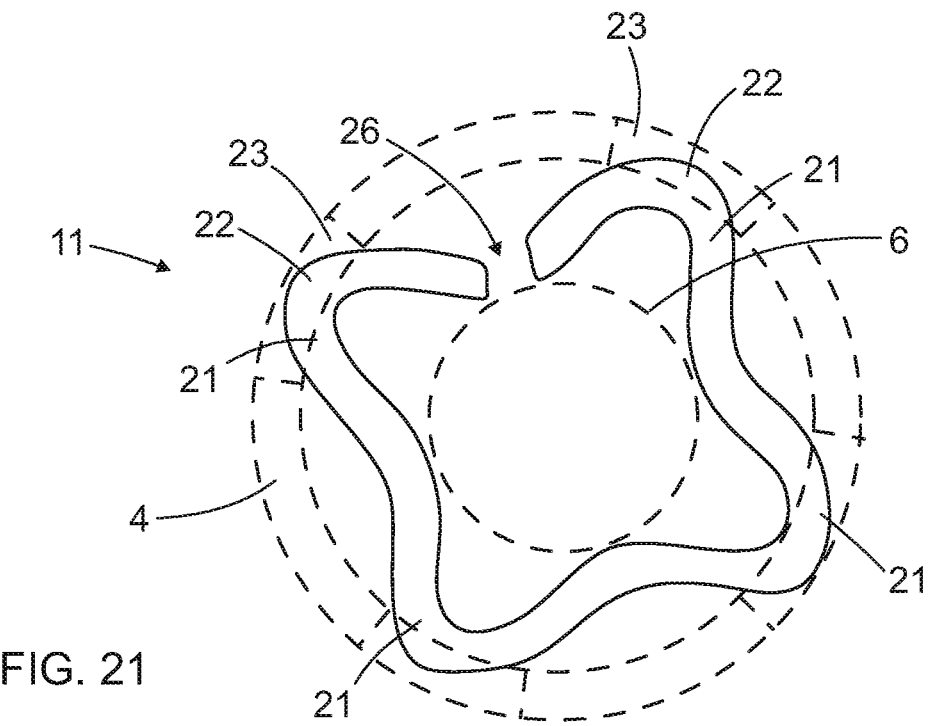
FIG. 21 is a schematic top view of a star-like retaining ring having four arms.

FIG. 21 discloses a retaining ring 11 having starlike configuration with four arms 21 or protruding parts. Tip portions of the arms 21 are configured to be placed axially against a stopping shoulder, groove or surface. Alternatively the tips may be configured to generate required friction forces for friction mounting. The retaining ring 11 may have a slot 26 for facilitating the mounting and dismounting of the retaining itself and a valve stem 6.

FIG. 21 also discloses an embodiment wherein tips 22 of the arms 21 are received by openings 23 or slots formed to a valve body 4. The slots may be done by a milling or cutting tool for example.

It may also be possible to provide a retaining ring with five or more arms, for example 6-10 arms. Further, in some cases it may even be possible to use a retaining ring with only three arms.

Figure 22:
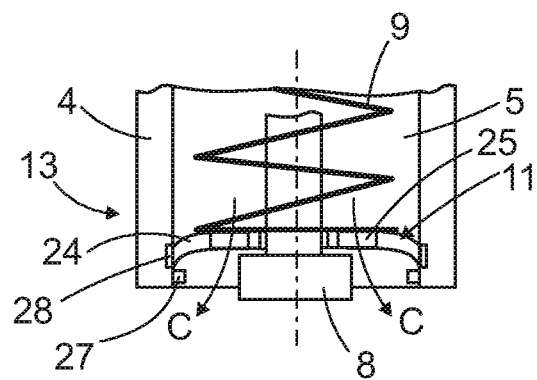
FIG. 22 is a schematic side view showing an alternative solution for a locking system of previous FIG. 14.

FIG. 22 discloses that bendable portions 24 of a retaining ring 11 may be supported axially against a shoulder 27, or alternatively there may be a groove 28 for receiving outermost part of the retaining ring. The shoulder 27 and the groove 28 may be used to secure the fastening of the retaining ring 11 if so desired. The shoulder and the groove may be called as a stopping surface or element.

Figure 23:
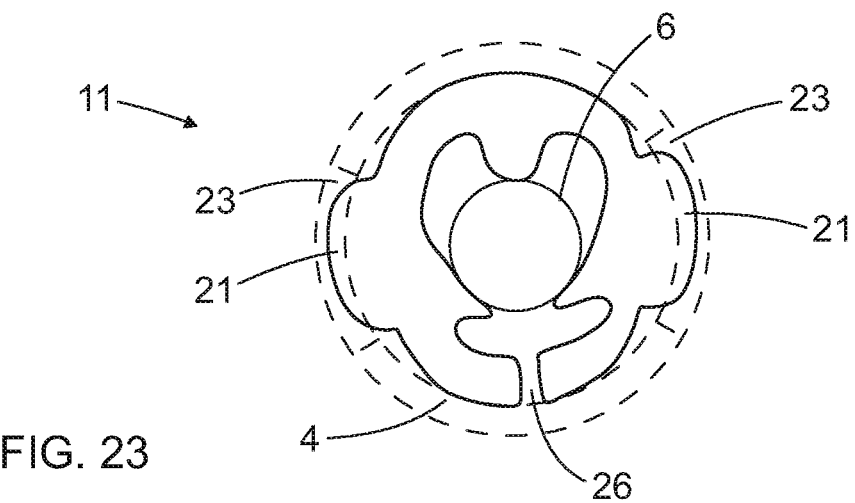
FIG. 23 is a schematic top view of a retaining ring having two protrusions.

FIG. 23 discloses a retaining ring 11 comprising two protrusions 21 or arms which may be positioned to openings 23 of a valve body 4. The protrusions 21 may be located on opposite sides of the retaining ring 11.

The drawings and the related description are only intended to illustrate the idea of the invention. In its details, the invention may vary within the scope of the claims.

The invention claimed is:

1. A venting valve for removing air from a vulcanising mould of a vehicle tire, wherein the venting valve comprises:
    a first end configured to face towards an interior of the vulcanising mould and a second end configured to face away from the interior of the vulcanising mould;
    a valve body;
    a venting channel passing through the valve body;
    a movable valve stem arranged inside the venting channel and comprising a first end provided with a valve member for opening and closing the venting channel, and a second end provided with a collar;
    a spring element for pressing the movable valve stem in opening direction towards an opening position wherein air flow through the venting channel is allowed; and
    an internal retaining ring at a second end part of the valve body which is configured to form retaining surfaces preventing the collar to pass, wherein the internal retaining ring is configured to serve as an axial support for the spring element at the second end part, and, wherein the internal retaining ring comprises radial inner surfaces facing towards the movable valve stem and providing transverse support for the movable valve stem.

2. The venting valve of claim 1, wherein the internal retaining ring is an elastically deformable element which has a basic shape and is squeezable temporarily to reduced dimensions.

3. The venting valve of claim 1,
    wherein the collar is provided with a first conical surface, and
    wherein the first conical surface is facing the second end of the valve body and is configured to cause the internal retaining ring to expand when the movable valve stem is mounted longitudinally inside the venting channel.

4. The venting valve of claim 1,
    wherein the collar is provided with a second conical surface, and
    wherein the second conical surface is facing the first end of the valve body and is configured to cause the internal retaining ring to expand when the movable valve stem is removed from the venting channel by pushing it longitudinally towards the first end of the valve body.

5. The venting valve of claim 1, wherein a cross sectional diameter of the venting channel is constant between the first and second end of the valve body.

6. The venting valve of claim 1, wherein the movable valve stem and the collar have solid configuration.

7. The venting valve of claim 1, further comprising:
    a retaining groove on an inner surface of the venting channel for receiving the internal retaining ring that is mounted inside the retaining groove to partly protrude inside the venting channel for forming retaining surfaces preventing the collar to pass.

8. The venting valve of claim 1, wherein the internal retaining ring comprises radial inner surfaces which are provided with curved surfaces which together resemble a circle corresponding to a round cross sectional shape and dimensions of the movable valve stem at a location of the internal retaining ring.

9. The venting valve of claim 1, wherein the internal retaining ring is friction mounted against surfaces of the venting channel.

10. The venting valve of claim 1, wherein the internal retaining ring comprises at least one de-formable retaining element configured to deform during the mounting and to cause retaining forces directed towards surfaces of the venting channel.

11. The venting valve of claim 1,
    wherein the internal retaining ring comprises at least one radial protrusion extending from a radial outer surface,
    wherein the valve body comprises at least one radial opening passing through the valve body, and
    wherein the at least one radial opening of the valve body is configured to receive the at least one radial protrusion of the internal retaining ring.

12. The venting valve of claim 1,
    wherein the internal retaining ring comprises,
        an outer ring element configured to serve as a retaining element for fastening the internal retaining ring axially inside the venting channel, and
        an inner ring element configured to serve as an axial retaining surface against the collar of the movable valve stem and also configured to provide transverse support for the movable valve stem.

13. The venting valve of claim 12, wherein the outer ring element is configured to serve also as an axial support surface for the spring element.

14. The venting valve of claim 12, wherein the inner ring element is configured to serve also as an axial support surface for the spring element.

15. The venting valve of claim 12, wherein the inner ring element is provided with a radial slot allowing the inner ring element to expand after the movable valve stem is mounted.

16. The venting valve of claim 1, wherein the internal retaining ring comprises a radial outer portion and a radial inner portion which are configured to extend different distances in axial direction of the venting valve, and wherein a stroke length of the movable valve stem is configured to be influenced by the axial extension of the radial inner portion of the internal retaining ring.

17. A method of mounting a valve stem of a venting valve comprising a valve body provided with a longitudinal venting channel, wherein the method comprises:
    pushing the valve stem under external mounting force longitudinally in a mounting direction inside the longitudinal venting channel against a spring force generated by means of a spring element; and
    providing the valve stem with a collar and preventing the valve stem from escaping from the longitudinal venting channel using an internal retaining ring mounted inside the longitudinal venting channel and supporting the collar against the internal retaining ring after the external mounting force is released and the spring force is allowed to move the valve stem in the mounting direction;
    providing the valve stem with lateral guidance at a second end part of the valve body using protruding parts of the internal retaining ring; and
    supporting the spring element axially at the second end part using the protruding parts of the internal retaining ring.

18. The method of claim 17, further comprising:
    expanding size of the internal retaining ring radially using conical surfaces of the collar when pushing the valve stem axially towards the mounting direction and correspondingly pushing the valve stem in an opposite direction when dismounting the valve stem.

19. The method of claim 17, further comprising:
    squeezing the internal retaining ring into smaller size;

mounting the internal retaining ring inside the longitudinal venting channel;

pushing the internal retaining ring axially towards a retaining groove; and allowing the internal retaining ring to expand when the internal retaining ring and the retaining groove on an inner surface of the longitudinal venting channel match in an axial direction of the venting valve, wherein expanding of the internal retaining ring causes the internal retaining ring to be locked into the retaining groove.

\* \* \* \* \*